(No Model.)
C. C. WALWORTH.
FIRE EXTINGUISHER.
No. 281,169. Patented July 10, 1883.
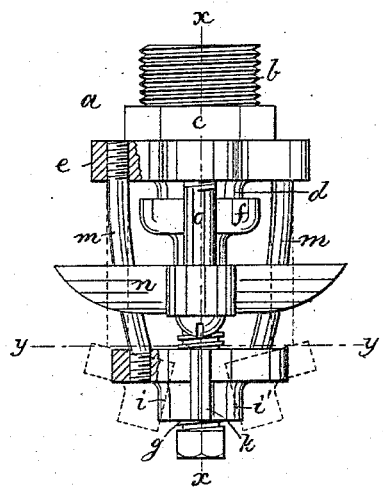
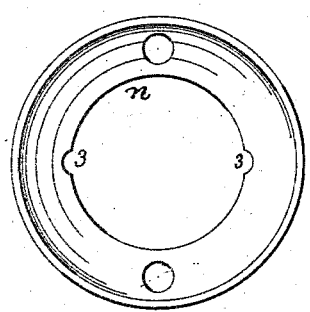
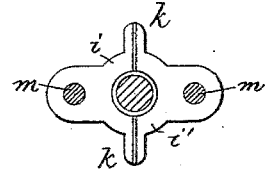
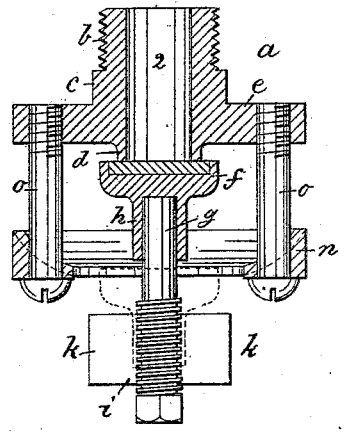
Witnesses
Bernice J. Noyes.
Fred A. Powell.
Inventor.
Caleb C. Walworth
by Crosby & Gregory
Atty's.

UNITED STATES PATENT OFFICE.

CALEB C. WALWORTH, OF BOSTON, MASSACHUSETTS.

FIRE-EXTINGUISHER.

SPECIFICATION forming part of Letters Patent No. 281,169, dated July 10, 1883.

Application filed January 2, 1883. (No model.)

*To all whom it may concern:*

Be it known that I, CALEB C. WALWORTH, of Boston, county of Suffolk, State of Massachusetts, have invented an Improvement in Fire-Extinguishers, of which the following description, in connection with the accompanying drawings, is a specification—like letters on the drawings representing like parts—

My invention, relating to automatic fire-extinguishers, is embodied in an extinguisher of that class in which the water is held back by a valve that is released by the softening or melting of a material or solder that is fusible at a very low temperature, so as to be melted by the first heat of a conflagration.

My invention consists, mainly, in a novel holding device for the valve, by which it is retained upon its seat, the said holding device being kept in operative position by fusible or yielding material which does not of itself afford the strength by which the valve is held upon its seat. The valve-holding device consists of a nut divided longitudinally and having its parts fastened together by the fusible material and acted upon by springs tending to separate them. The valve-stem is threaded and screwed into the said nut to press the valve against its seat, and it will be seen that if square threads are used the pressure will be wholly sustained by the threads, while the solder will only have to be strong enough to resist the springs by which the portions of the nut are to be separated when the solder is fused, so as to release the valve-stem and permit the valve to open.

The invention also consists in details of construction of the extinguisher, in which the main invention is in this instance embodied.

Figure 1 is a front elevation of an automatic fire-extinguisher embodying this invention; Fig. 2, a vertical section thereof on line $x\,x$; Fig. 3, a plan view of the water-spreading device detached; and Fig. 4, a horizontal section on line $y\,y$, Fig. 1, showing the valve-holding device.

The main or water-delivering portion $a$ of the extinguisher, provided with the usual threads, $b$, and wrench-faces $c$ for connecting it with a water-pipe, and having its water-passage 2 terminating in a valve-seat, $d$, is made with a flange or rim, $e$, with which the other parts are connected.

The valve $f$ has a stem, $g$, preferably free to rotate in its socket $h$, and shown in this instance as provided with square threads to engage the valve-holding device, consisting of a nut or threaded socket, $i\,i'$, made in two portions, united by fusible solder or material that will melt or disintegrate upon rise in temperature above a certain limit. The solder is shown in this instance as inserted between soldering-wings $k$, projecting from the portions $i\,i'$ of the nut, which is connected with the main portion $a$ of the extinguisher by arms $m$, which also constitute the springs for separating the portions $i\,i'$ of the nut to release the valve, the said arms being elastic and bent from their normal straight condition when the two parts of the nut are united, as shown in full lines, Fig. 1.

It will be seen that the pressure of the valve against its seat can be adjusted by rotating its stem, and that no strain is produced upon the solder, which is merely acted upon by the elastic force of the arms or springs $m$. When the solder or material connecting the two portions of the nut is so weakened by a rise in temperature as to be overcome or broken by the springs $m$, the nut will be separated, as shown in dotted lines, Fig. 1, disengaging the valve-stem, which falls by its own weight, assisted by the pressure of the water on the valve, which also drops, but is arrested by the separated nut, the parts of which do not move far enough to permit the valve to pass through between them. The valve thus remains in the path of the stream of water issuing from the passage 2, and breaks it up, so that it does not fall as a solid stream, but is scattered about.

In order to spread the water and direct a portion of it upward, a spreading device, $n$, is employed, (shown as an annular saucer-shaped piece,) supported upon standards $o$, connected with the flange $e$ of the main portion of the extinguisher, it being passed over the nut $i\,i'$. The valve $f$, when released from its seat and supported on the separated nut, as shown in dotted lines, Fig. 2, rests within and nearly fills the opening of the spreading device, there being, however, sufficient space to permit some of the water to pass down directly beneath the extinguisher. The spreading device $n$ is provided with recesses 3 to receive the spring-arms m when the nut is separated by them. It is not essential that the threads of the nut and valve-stem should be square, although, if the ordinary V-threads were used, a slight force might be brought upon the solder in addition to the strain of the springs. Such strain, however, will not usually be objectionable, but will generally be desirable, as it will increase the certainty of the valve-opening promptly, the essential feature of the invention being that the valve-holding device or nut is made of ordinary material not affected by the small change in temperature required to fuse or disintegrate the solder. By the term "fusible solder" I mean to include as its equivalent any material that is melted or consumed or weakened and disintegrated by a small rise in temperature.

I claim—

1. In an automatic fire-extinguisher, the combination of the main portion provided with a valve-seat, with the valve, its threaded stem, and the divided valve-holding nut having its parts united by fusible solder or equivalent material, substantially as described.

2. The main portion of an automatic fire-extinguisher, provided with a valve-seat, and the valve and its threaded stem, combined with the divided valve-holding nut having its parts united by fusible solder or equivalent, and springs tending to separate the said parts, substantially as described.

3. The main portion of an automatic fire-extinguisher, provided with a valve-seat, and the valve and its threaded stem, and divided valve-holding nut, combined with the annular spreading device to receive within its opening the valve when released from its seat, substantially as described.

4. The main portion of an automatic fire-extinguisher and valve, combined with the divided valve-holding nut having its two portions united by fusible solder, and the spring-arms by which the said nut is connected with the main portion of the extinguisher, and by which its parts are separated when released by the softening or melting of the said solder, substantially as described.

5. The combination of the main portion of an automatic fire-extinguisher, provided with a valve-seat, with the valve and its threaded stem, and divided valve-holding nut, the parts of which are provided with soldering-wings adapted to be fastened together by easily-fusible solder, substantially as described.

In testimony whereof I have signed my name to this specification in the presence of two subscribing witnesses.

CALEB C. WALWORTH.

Witnesses:
JOS. P. LIVERMORE,
BERNICE J. NOYES.